United States Patent [19]
Adley

[11] Patent Number: 5,956,211
[45] Date of Patent: Sep. 21, 1999

[54] CHIP ATTACHED TO ACTUATOR ARM HAVING HEAT CONDUCTING FIBERS

[75] Inventor: James M. Adley, Hutchinson, Minn.

[73] Assignee: Questek Innovations, Inc., Waconia, Mich.

[21] Appl. No.: 08/962,476

[22] Filed: Oct. 31, 1997

[51] Int. Cl.[6] ..................................................... G11B 5/54
[52] U.S. Cl. ............................................................ 360/104
[58] Field of Search ..................................... 360/104–106

[56] References Cited

U.S. PATENT DOCUMENTS

| | | | |
|---|---|---|---|
| 4,789,914 | 12/1988 | Ainslie et al. | 360/103 |
| 4,891,723 | 1/1990 | Zak | 360/106 |
| 5,168,185 | 12/1992 | Umehara et al. | 360/106 |
| 5,245,489 | 9/1993 | Kimura et al. | 360/104 |
| 5,283,704 | 2/1994 | Reidenbach | 360/104 |
| 5,384,675 | 1/1995 | Crawforth et al. | 360/97.01 |
| 5,465,186 | 11/1995 | Bajorek et al. | 360/113 |
| 5,560,097 | 10/1996 | Bajorek et al. | 29/603.12 |
| 5,729,399 | 3/1998 | Albrecht et al. | 360/75 |
| 5,805,382 | 9/1998 | Lee et al. | 360/104 |

FOREIGN PATENT DOCUMENTS

| | | | |
|---|---|---|---|
| 0318228 | 5/1989 | European Pat. Off. . | |
| 59-168968 | 9/1984 | Japan | 360/104 |
| 3-025717 | 2/1991 | Japan . | |
| 3-187295 | 8/1991 | Japan . | |
| 3-272015 | 12/1991 | Japan . | |

*Primary Examiner*—Jefferson Evans
*Attorney, Agent, or Firm*—Schwegman, Lundberg, Woessner & Kluth, P.A.

[57] ABSTRACT

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The first embodiment of the actuator assembly also includes an arm which has a first layer of material including a plurality of elongated fibers orientated in a first direction, and a second layer of material including a plurality of elongated fibers orientated in a second direction. The first and second layers are part of a composite material. The second embodiment of the actuator assembly also includes an arm made of a ceramic material. The transducer is attached to the arm. The resulting actuator arm is long and stable. A preamplifier chip is attached to the arm near the end carrying the transducer. The material of the arm is able to conduct heat away from the arm by moving it from the preamplifier chip to the surface of the arm in the airstream between the disk and the arm. The arm may also include signal-carrying wires which are positioned between the layers of the composite arm and heat conductive fibers to remove heat from a heat producing source, such as from a chip on the arm.

4 Claims, 7 Drawing Sheets

CHIP ATTACHED TO ACTUATOR ARM HAVING HEAT CONDUCTING FIBERS

FIELD OF THE INVENTION

The present invention relates to the field of mass storage devices called disk drives. More particularly, this invention relates to a method and apparatus for placing an electronics chip on the actuator arm of a disk drive in close proximity to the end of the actuator arm to which the transducer is attached.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 5100 and 7200 RPM. Rotational speeds of 10,000 RPM and higher are contemplated for the future. At such speeds, the very small ceramic block flies on a very thin layer of gas or air. In operation, the distance between the small ceramic block and the disk is very small. Currently "fly" heights are about 0.0003 mm. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

The actuator assembly is composed of many parts that contribute to the performance required to accurately hold the read/write head in the proper position. An actuator includes a pivot assembly, an arm, a voice coil yoke assembly and a head gimbal suspension assembly. A suspension or load beam is part of the head gimbal suspension assembly.

One end of the suspension is attached to the actuator arm. The read/write head is found attached to the other end of the suspension. One end of the actuator arm is coupled to a pivot assembly. The pivot assembly is in turn connected to a servo motor system through the voice coil yoke. The other end is attached to the head gimbal suspension assembly. The head gimbal suspension assembly allows the read/write head to gimbal for pitch and roll to follow the topography of the imperfect memory disk surface. The head gimbal assembly also restricts motion with respect to the radial and circumferential directions of the memory disk. The suspension is coupled to the actuator arm as part of the mounting support holding the pivot support and coupled to the servo motor. Currently, the pivot assembly is mounted within an opening in a unitized E-block. The E-block includes arms for mounting the suspension on one end and a voice coil yoke on the other end. U.S. Pat. No. 5,283,704 issued to Reidenbach illustrates another actuator system composed of individual components instead of the unitized E-block. This actuator system is "built up" from an actuator arm, spacer rings, a separate voice coil yoke frame assembly, and a separate bearing cartridge. A voice coil is located on the voice coil yoke. The voice coil and magnets attached to the housing of the disk drive form a voice coil motor. The disk drive includes a feedback control loop to enable accurate positioning of the transducer. The disk drive system sends control signals to the voice coil motor to move the actuator arm and the suspension supporting the read/write head across the memory disk in a radial direction to the target track. The control signals indicate to the motor the magnitude and direction of the displacement. The control signals can also be used to maintain the position of the read/write head or transducer over a particular track.

To minimize noise and the inductance of the leads, the preamplifier and write-current sources are usually placed near the actuator arms. Wires or leads are typically strung over the surface of the actuator arm and pass to the preamplifier attached near the actuator arm. The wires are typically twisted in pairs to minimize cross talk between the wires. Cross talk results in noise in the wires which may produce inaccurate readback signals sent to the preamplifier. Minimizing noise from the preamplifier is critical since noise from the preamplifier may produce dominating noise in the amplifiers which follow in the channel circuitry. Moving the preamplifier as close to the transducer as possible minimizes noise in the leads and noise produced in the channel circuit. In addition, moving the chip closer to the transducer improves the frequency response of the head and the preamplifier chip as a function of the interconnect impedance.

In the past, various industry pundits determined that it would be very advantageous to place a preamplifier or channel chip on the actuator arm in a rotary actuator disk drive. Chips have been placed on the arms of some linear actuators where interdisk spacing, and the weight of the arm were not concerns. Placing the chip on the thin stainless steel arms or suspension load beams associated with today's disk drives with rotary actuators could not be done since the heat produced cannot be dissipated by a thin, stainless steel actuator arm or suspension. A chip could be placed on thick aluminum arms or E blocks, but the benefit would be minimal since the head and transducer would still be 25 mm or more away. Some current disk drive designs have the chip mounted in the flex cable attaching to the base of the arm, so moving the chip to the end of the arm using conventional arm and suspension lengths would produce minimal benefit.

There were also problems with spacing between the arms of a disk drive. When a preamplifier chip in conventional packaging and flex circuits was added to the arm, the spacing between the disks would have to be increased to accommodate the thickness of the chip package. Pockets could not be formed in the stainless steel arm since the material is too thin to dissipate the heat generated by the chips.

There is always a need for channels with less noise. Channels with less noise have lower read error rates. In addition, if the signal is easier to read, the data retrieval process may be able to be conducted more quickly with lesser need for error correction codes and error correction procedures. Consequently, there is always a need for a more noise free signal to increase the reliability of the channel and increase the integrity of the data stored on the disk.

SUMMARY OF THE INVENTION

A disk drive system includes a base, a disk rotatably attached to the base, and an actuator assembly movably attached to the base. The actuator assembly moves the transducer to selected areas of the disk where information representative of data is to be written or read. The actuator assembly maintains the transducer in a transducing relationship with the disk. The actuator assembly also includes an arm which has a first layer of material including a plurality of elongated fibers orientated in a first direction, and a second layer of material including a plurality of elongated fibers orientated in a second direction. The first and second layers are composed of a composite material. The transducer is attached to said arm. The transducer may be attached to the arm through the head gimbal suspension assembly. The resulting actuator arm has vibrational modes with a movable or shiftable resonant frequency. The resonant frequency can be varied or shifted by varying the direction of the elongated fibers in the second layer with respect to the direction of the elongated fibers in the first layer. The resonant frequency is varied so that it is at a different frequency than the resonant frequencies of other components of the disk drive, such as the resonance frequency of the disk stack (the disk or disks of the drive). The arm may also include signal carrying wires which are positioned between the layers of the composite arm or within a single layer of the composite arm.

The invention teaches an actuator arm made of a material that allows the preamplifier chip to be directly attached to the arm. In addition, a long arm and short suspension are used and taught. This places the preamplifier chip in close proximity to the transducer within the slider. The slider and transducer may also be called the head. Placing the preamplifier function near the read/write transducer increases the head signal frequency response of the transducer/chip/interconnect system by reducing the interconnect inductance, resistance, and capacitance. The short leads from the head to the preamplifier provide a lower impedance and less noise pickup than previous wiring schemes. The mounting of the chip on a long arm made possible by light, stiff materials to within 7 mm of the head transducer results in substantial circuit frequency improvement. As the lead length approaches zero, only the head and preamplifier electrical characteristics determine the frequency response. Future data storage will require much higher frequency chip/head designs so that the interconnect electrical performance will become more critical in the future.

Head/write chips generate considerable amounts of heat, particularly when writing data. Actuator arms made of fiber composite and including high heat conducting fibers, such as Amoco K1100 graphite fibers, can dissipate the heat. The heat conducting fibers conduct heat away from the chip at a rate three times faster than copper. Unlike conventional suspensions made of stainless steel and approximately 0.0025" thick, the arm is usually 0.030" or greater in thickness and can provide the necessary thermal conduction to cool a chip or die mounted directly onto the arm. Actuator arms made of ceramic materials, such as Dow Chemical, Midland, Mich., $AlB_4C$ cermet, can also conduct and dissipate heat from a preamplifier chip attached to the actuator arm. The materials used to form the long, light, stiff actuator arms not only allow placement of a chip close to the head and transducer, but can be designed to safely conduct the heat away from the chip.

In addition, the long arm provides a stable mounting position for the chip. The slider and suspension must track the disk media surface very accurately. Vibration can be a considerable problem. Vibration may cause electrical junction reliability problems since the chip will require from 11 to 19 electrical wire connections. Wires can be firmly attached to the arm. Wires may also be embedded if using a fiber composite arm. The chip may also be embedded so that there is no relative motion possible between the chip and the input wiring when both are mounted on the rigid arm.

Advantageously, the resulting actuator arm has the preamplifier mounted very closely to the transducer and the slider carrying the head. As a result, the signal produced has less noise and also features a higher frequency response. The material of the arm is capable of conducting heat away from the chip. In addition, a composite material is conductive and reduces stray field pickup and prevents cross talk in the signal carrying leads. The material is strong enough to withstand the weight of the chip. The chip and the signal carrying wires can also be placed or embedded in the arm to prevent relative motion and an eventual open connection between the signal carrying wire and the preamplifier chip. The stiffness of the arm can also be controlled in various directions so that the resonances can be changed to frequencies other than the resonant frequencies of other components of the disk drive. An additional advantage is that the lighter actuator arm has increased shock resistance. The increased shock resistance yields a more robust drive.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
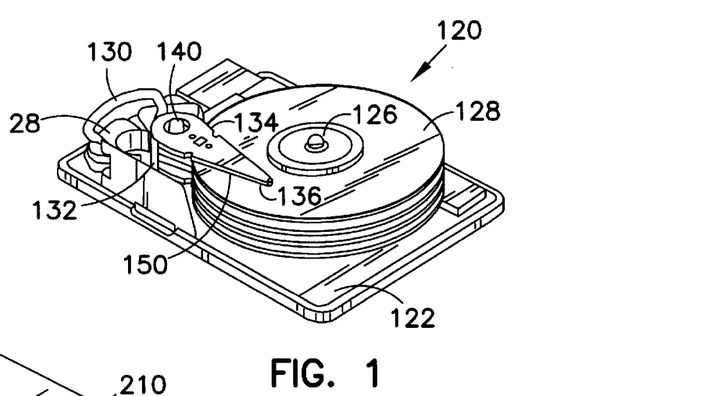
FIG. 1 is an isometric view of a disk drive having a rotating disk, an actuator, and an arm made of a composite material.
Figure 2:
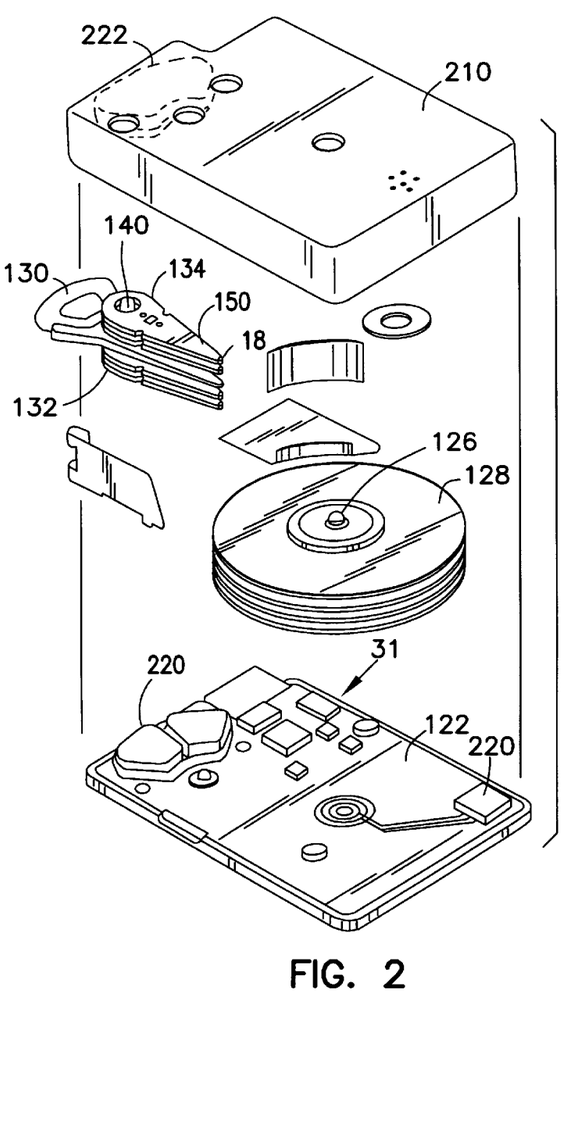
FIG. 2 is an exploded isometric view of a disk drive having a rotating disk, an actuator, and an arm made of a composite material.

Referring to FIGS. 1 and 2, the principal electrical and mechanical components of a disk drive constructed in accordance with a preferred embodiment of the present invention are illustrated. The disk drive includes a head/disk assembly ("HDA") 120 which includes a base 122 and a cover 210 (shown in FIG. 2). Attached to the base 122 is a spindle with an attached hub 126. Attached to the spindle with an attached hub 126 is a disk 128. Also attached to the base is a spindle motor for rotating the spindle with an attached hub 126 and the disk 128. Spindle motor driver circuitry 220 controls the current passing through the spindle motor to produce a torque and controllably rotate the hub and disk 128 attached to the spindle. An actuator assembly 132 is also attached to the base 122. The actuator assembly 132 includes arms 134 and suspensions 150 which carry transducers 136 in transducing relation to the disk 128. The arms 134 are attached to a pivot apparatus, such as a bearing cartridge 140. Attached to the arms 134 are the suspensions 150. The transducers 136 are encapsulated within or supported by a slider or small ceramic block mounted to the suspension. The slider carries the transducer over the disk. The other end of the actuator assembly 132 includes a portion of an actuator motor 130. The portion of the actuator motor shown attached to the actuator assembly 132 is the voice coil. The actuator motor, formed of the voice coil and magnets 220 and 222 (shown in phantom), is used to move the actuator assembly 132 and, more specifically, the transducers 136, also commonly referred to as read/write heads, to different radial positions relative to one or more surfaces of the disk 128.

Figure 3:
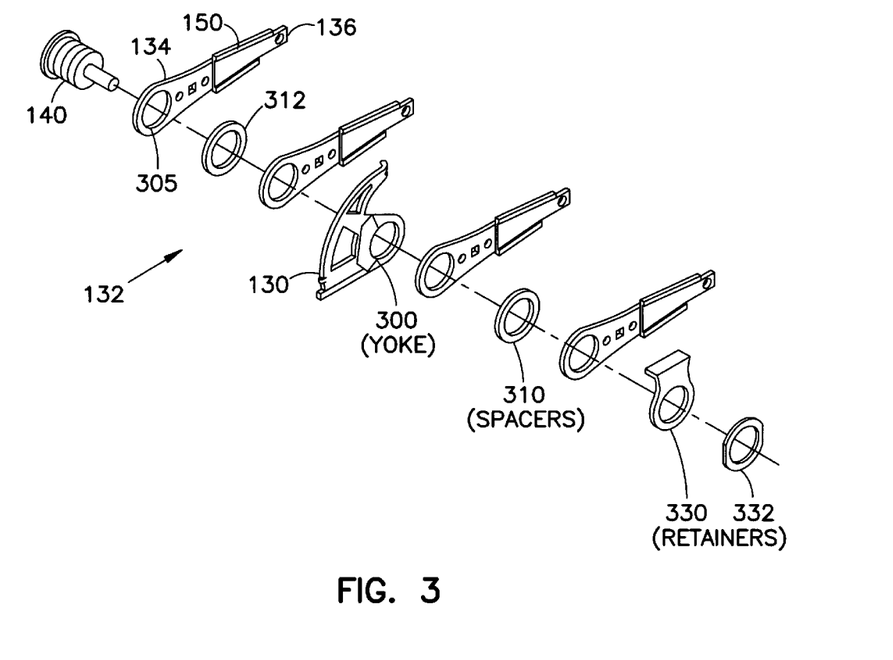
FIG. 3 is an exploded isometric view of an actuator assembly.

FIG. 3 is an exploded isometric view of an actuator assembly 132. The actuator assembly 132 includes a number of arms 134 having suspensions 150 attached to each of the arms. Attached to each of the suspensions 150 is a transducer 136. Although four arms are shown in FIG. 3, only one is labeled with reference numerals since they are all substantially identical. The arm 134 has an opening 305 therein. The opening 305 fits over the outside diameter of the bearing cartridge 140. Several spacers 310 and 312 are also included in the actuator assembly 132. The spacers 310 and 312 space adjacent arms 134 away from each other such that the arms can pass between the disks 128. The actuator assembly 132 also includes a yoke 300 which holds the voice coil 130 of the voice coil motor. The yoke includes an opening 303 which also fits over the bearing cartridge 140. Also included are several retainers 330 and 332. The retainers 330 and 332 fit over the top of the bearing cartridge and maintain the actuator assembly 132 in an assembled position. The yoke 300 also serves as a spacer. During assembly, an arm 134 is formed and a suspension 150 is attached to one end of the arm 134. The suspension 150 typically carries the transducer 136. The first arm 134 is placed over the bearing cartridge such that the transducer faces upwardly or can read the bottom surface of one of the disks 128. A spacer 312 is then placed atop the first arm, a subsequent arm is then added to the bearing cartridge. The yoke 300 is then added as are another arm, another spacer 310 and a final arm. The entire assembly is held in place by the retainers 330 and 332. The actuator assembly 132 is usually assembled in a jig which includes an alignment mechanism. Each of the arms 134 includes an opening which can receive a rod or other withdrawable tool that can be used for alignment of the various components of the actuator assembly 132.

Figure 4A:
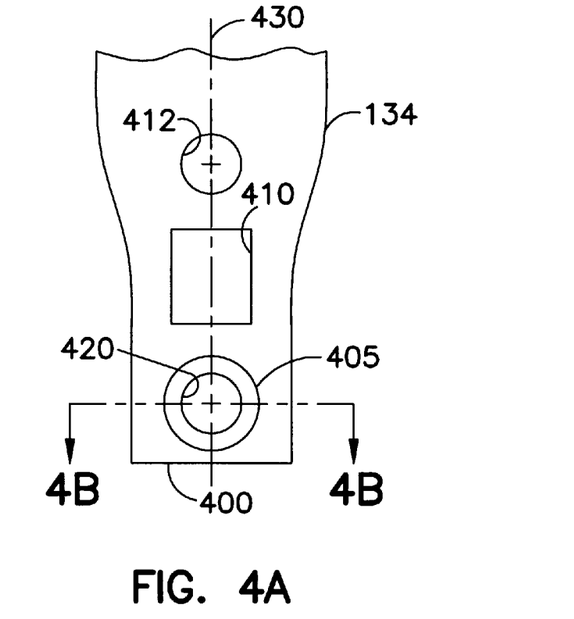
FIG. 4A is a top view of the actuator arm.
Figure 4B:
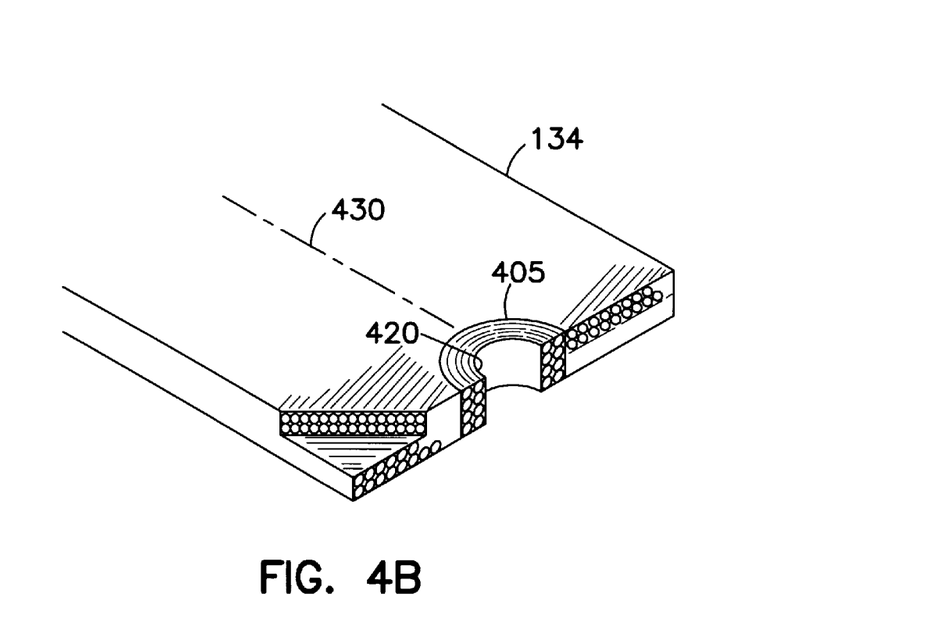
FIG. 4B is a cutaway view showing reinforcing lay-up for a swage opening.

FIG. 4A is a top view of an actuator arm 134. The actuator arm 134 has an opening 305 at one end for attaching to a bearing cartridge (shown in FIG. 3). The other end is a suspension-attach region 400 and includes a swage opening 420 so that a suspension (shown in FIG. 3) can be attached to the arm 134 using a swaging technique. The arm 134 also includes an alignment hole 410 and an alignment hole 412 which accommodate alignment tools from a jig used to form the actuator assembly. The alignment holes 410 and 412 maintain the alignment of the various arms as the actuator assembly is assembled. The use of a swaging technique on a composite arm would require a cylindrical fiber lay-up 405 to handle the radial stress generated from a swage mount as shown in FIG. 4B. A metal insert could be substituted for the cylindrical fiber lay-up 405 that handles the radial stress generated by the swage but the thermal expansion mismatch between the composite and metal could cause temperature cycling problems. Other attachment methods may be needed to attach the stainless steel suspension to the light and stiff arm material, such as those presented in patent application Ser. No. 08/938,621 entitled "Hot Crimp Attachment Technique and Apparatus for Attaching Suspension" filed Sep. 25, 1997, and Ser. No. 08/938,620 entitled "Banded Suspension Attachment Technique and Apparatus for Attaching Suspension" filed Sep. 25, 1997. The arm 134 also includes a longitudinal axis 430 which is shown in FIG. 4A as a dotted line.

Figure 5:
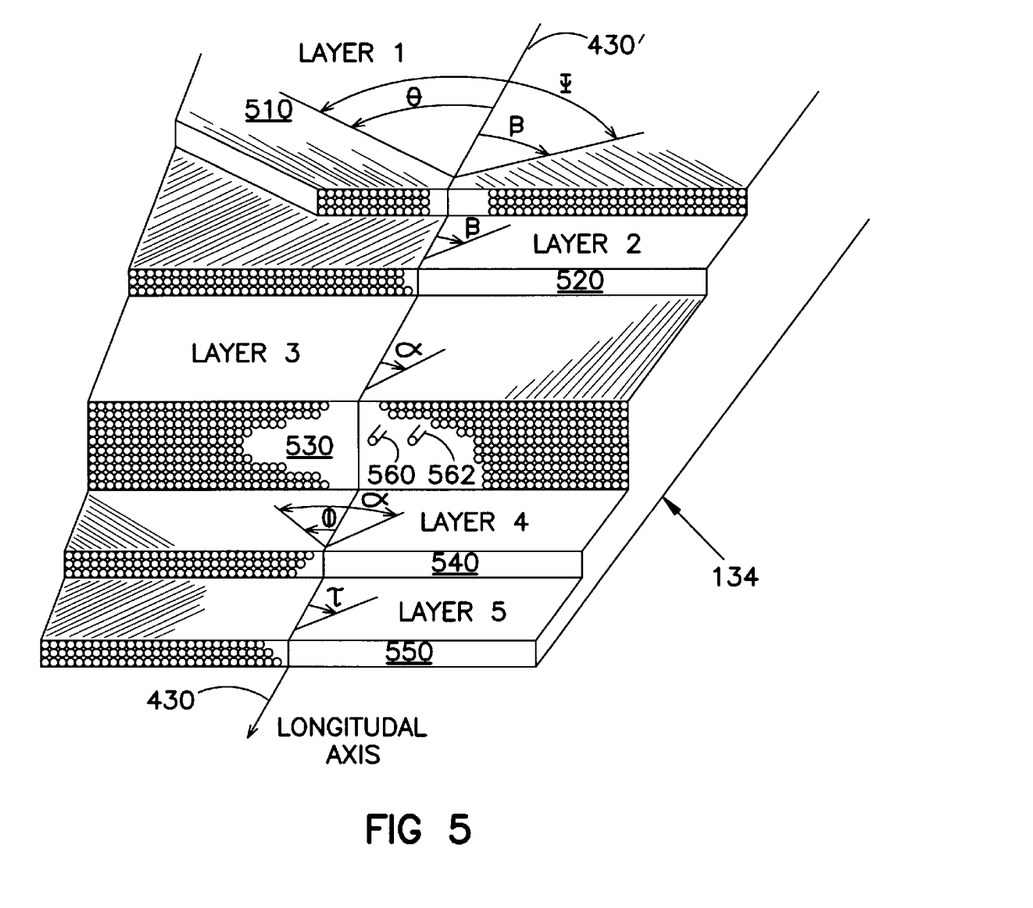
FIG. 5 is a cutaway perspective view of the actuator arm showing the directions of the fibers in the various layers of the arm.

Now turning to FIG. 5, a cutaway view of the actuator arm 134 showing the various layers of the composite material is shown. The arm 134 is comprised of five layers, 510, 520, 530, 540 and 550 of elongated fibers. The elongated fibers can be of carbon or boron or a similar material which has high tensile strength. Each layer 510, 520, 530, 540 and 550 includes a multiplicity of the elongated fibers placed substantially parallel to one another. The elongated fibers stiffen the arm 134 in one direction and are sometimes referred to as stiffening fibers. This material is available from many sources such as Hexel of San Francisco, Calif. and is commonly referred to by the trade name IM7. The middle layer 530 of the arm 134 is placed so that the elongated fibers within the layer 530 are substantially parallel to the longitudinal axis 430 of the arm 134 ($\gamma$~0). The elongated fibers in the remaining layers 510, 520, 540 and 550 are orientated at specific angles ($\theta$, $\beta$, $\phi$, $\tau$, respectively) both with respect to the longitudinal axis 430 as well as to each other to stiffen the torsional and sway modes of resonance and to also stiffen the bending modes of the arm 134. By varying the various angles shown, the resonant frequency of the arm 134 can be selected. In other words, by varying the various angles, the various resonant modes can be varied to resonate at a different frequency. Layer 510 is laid at an angle $\theta$ with respect to the longitudinal axis 430. As shown in FIG. 5, the longitudinal axis 430 has been also placed on the top of the arm 134 and is labeled as 430'. The longitudinal fibers of the second layer 520 make an angle $\beta$ with respect to the longitudinal axis 430. The elongated fibers in layer 510 make an angle $\psi$ ($\psi=\theta+\beta$) with respect to the elongated fibers of layer 520. Generally, $\psi$ will be an angle of 90° if maximum strength is wanted between the two layers 510 and 520. However, the angle $\psi$ can be varied to vary the resonance of the actuator arm. Positioned between the layer 520 and the layer 530 are a pair of conductors or electrical signal-carrying wires 560 and 562. Advantageously, the signal-carrying wires 560 and 562 are formed between two layers 520 and 530 so that they do not have to be attached to the exterior portion of the arm 134. The elongated fibers in layer 540 make an angle φ with respect to the longitudinal axis 430 of the arm 134 and the elongated fibers of layer 550 make an angle τ with respect to the longitudinal axis 430 of the arm 134. The elongated fibers in layer 540 make an angle α with respect to the elongated fibers in layer 550. Once again, the angle α would be approximately 90° to obtain the maximum amount of strength and stiffness between the layers 540 and 550, however, the angle α can be varied to vary the resonant frequency of the arm 134.

Basically, the angular relationship is computed by initializing θ, β, φ and τ at 45° and γ at 0°. The basic form factor of the arm is then determined from the available space and geometrical requirements of the specific disk drive design. Using the initial angles, and form factor (including tooling holes), the arm is computer modeled and the frequency of the natural resonance modes are calculated and compared to the disk stack resonance frequencies and the head/suspension resonance frequency. Vibrational modes of the arm that are frequency co-incident to significant vibrational modes of the disk stack or the suspension are then targeted for change. Bending mode frequencies are affected by changing the relative thickness of layer 530 with respect to the other four layers 510, 520, 540, and 550. The bending mode frequency is affected by the number of elongated fibers which are substantially parallel to the longitudinal axis 430 of the arm 134. Torsion or sway modes are affected by the angles θ, β, φ, and τ. Decreasing the angles θ, β, φ, and τ will move the torsion modes down in frequency. Increasing the angles θ, β, φ, and τ will increase the torsion mode frequencies, and lower the frequency of the bending modes.

Figure 6:
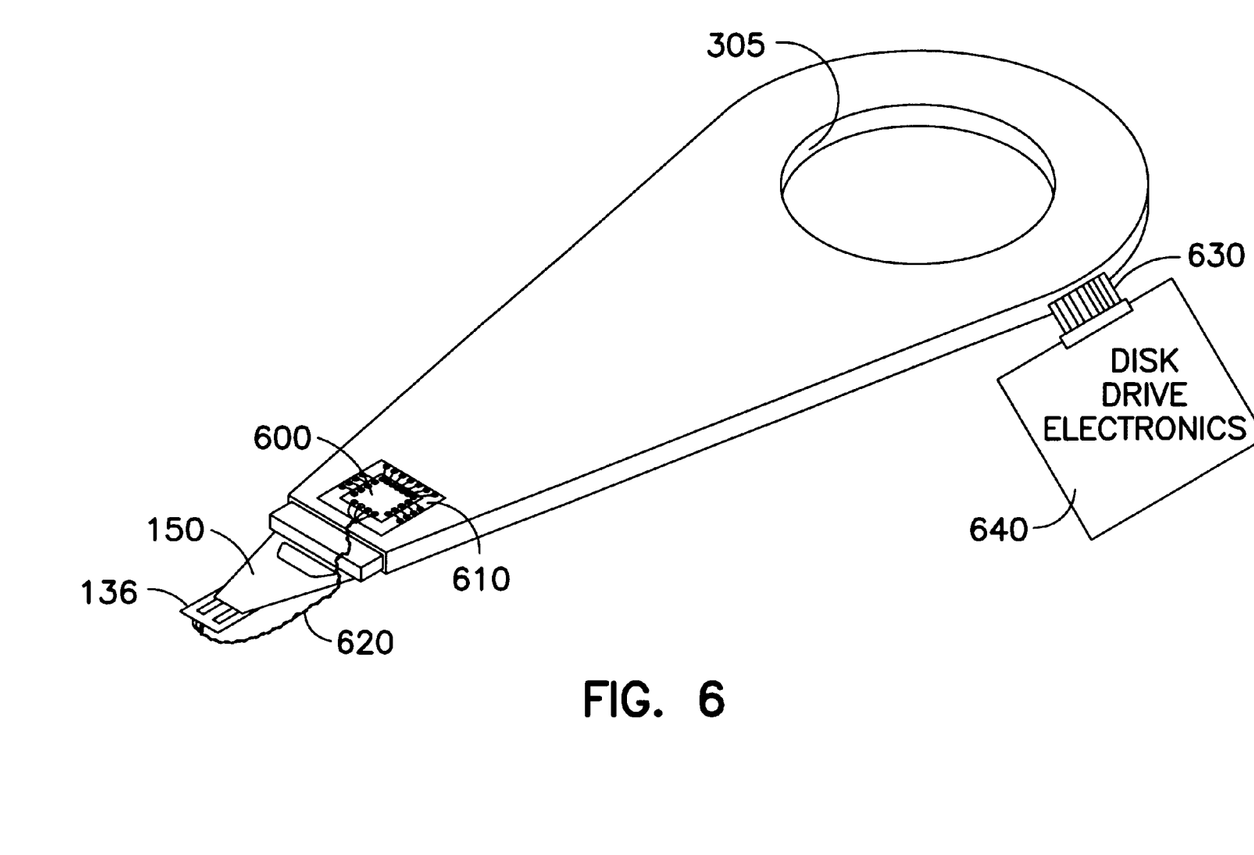
FIG. 6 is an isometric view of an arm mounted chip.

The light, stiff arm 134 allows a new configuration of the read/write head and the preamplifier chip. Referring to FIG. 6, the light, stiff arm 134 of fiber composite or ceramic allows the use of a short suspension 150 to maintain the read/write head or transducer 136 on the recording media disk. A single channel preamplifier chip 600 is mounted near the suspension attachment end of the long actuator arm 134. The preamplifier chip 600 is not packaged. The chip is the actual chip or die. The arm 134 is used as the packaging for the chip 600. The chip or die can have a series of pads to which the wires bond. The chip 600 can also be a flip-chip with solder balls on the outer perimeter of the chip. Other techniques such as a ball grid array or pin grid array can be used. The arm 134 includes a mating connector or set of pads. The chip or die 600 is positioned and then bonded to the arm 134 with conductive epoxy. A lead-frame or direct wire electrical attachment 610 is used to connect the power supply, control, and data electrical line inputs to the chip 600. For purposes of illustration, the chip 600 shown has pads to which leads attach. Short wire leads from the head 620 are wire bonded to the chip output pads as required for either inductive or magnetoresistive ("MR") heads. The wires 620 from the transducer 136 are routed either over or along side of the head flexure region in as short a route as possible to the preamplifier chip 600. Two wires are required for thin-film inductive heads and 4 or 5 wires are required for MR or giant magnetoresistive ("GMR") heads.

The wires from the transducing head 620 are wire bonded to the pads on the chip or die 600 mounted directly on the arm 134. Alternatively, any other means to electrically connect the head to its associated circuitry could be used to connect to the chip on the arm. One such way to electrically connect the head and associated circuitry is the TSA™ product made by HTI of Hutchinson, Minn. The short electrical interconnect between the short suspension and long arm provides reduced impedance regardless of the interconnect technology used. The short electrical interconnect may be even more advantageous when using technologies other than wires. In addition, the automation used to connect the wires, or other interconnection can be used with the chip or without the chip, facilitating an efficient manufacturing process.

Use of a fiber composite actuator arm allows incorporation of very high conductance fibers, such as K1100 graphite fibers made by Amoco of Chicago, Ill. Heat conducting fibers 800 can be embedded within the arm 134, either as one full layer or as a portion of a layer of the composite arm. In addition the wires carry the signals between the chip 600 near the opening 305 and an electrical connector 630 near the pivot end of the arm 134. The electrical connector 630 connects to the disk drive electronics 640, shown in schematic form in FIG. 6.

The K1100 graphite fibers have a conductance of 100 w/cm²/i, which is three times that of copper. These fibers conduct the heat away from the chip, particularly during the write operation. The heat is dissipated into the air, flowing over the arm 134 along the length of the arm 134. A ceramic arm can also conduct the heat away from the chip 600 and into the air stream, moving over the arm 600. Considerable heat can be dissipated by the arm 134 because of the large surface area of the long actuator arm 134 and high air flow rate associated with the disk media rotation. The actuator arm 134 has a thermal mass and thermal capabilities to dissipate the heat produced by the chip 600. Thin suspensions do not have the capability to dissipate heat.

The actuator arm 134 may have an opening or pocket 650 therein. The pocket 650 is dimensioned so that it will receive the chip 600 and a lead frame or other chip connecting device. Another option is to embed the chip 600 into the arm 134. The chip 600 can be partially or wholly embedded within the arm 134. Embedding the chip 600 either partially or wholly within the arm 134 provides for an advantage in that the wires 700 (shown in FIG. 7) do not move with relation to the chip 600. Therefore, the connection points or pads 710 are not stressed by relative motion between the wires 700 and the chip 600. This provides for a much more reliable connection between the wires 700 and the chip 600 and, therefore, provides for a much more reliable arm. Embedding the wires 700 in the arm 134 is also advantageous in that when the arm 134 is formed of a composite material, the carbon layers used are electrically conductive and hence can shield against electromagnetic fields. The embedded wires 700 are, therefore, wrapped in layers of carbon and are not subject to stray noise or cross talk between the various wires.

Figure 7:
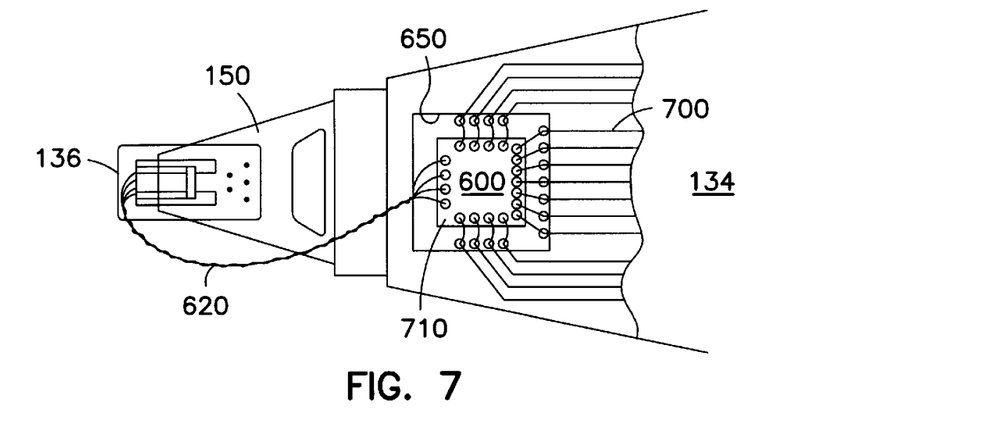
FIG. 7 is a bottom view of the arm mounted chip.
Figure 8:
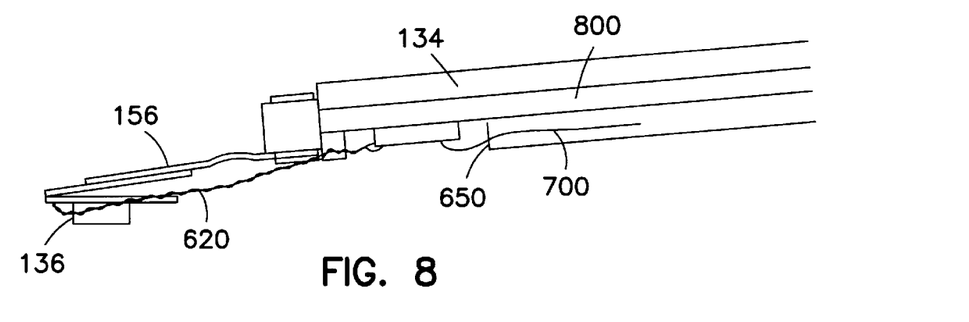
FIG. 8 is a side view of the arm mounted chip.

FIGS. 7 and 8 show a bottom view and a side view of the arm 134 carrying a chip 600 near the transducer 136. The wires 700 are shown embedded within the arm 134. As shown in FIGS. 7 and 8, the chip 600 fits within a pocket 650. The pocket 650 is dimensioned so that the chip 600 as well as the lead frame 610 can fit within the pocket 650. The chip 600, the transducer 136, the wires 620 and wires 700, as well as the connector 630 and disk drive electronics 640, all form part of a data channel which is used to either write data to a disk or read data from a disk. The chip 600 is typically a preamplifier which preamplifies the signals from the transducer during the read operation. A preamplifier, such as the chip 600, can be set up to receive one channel or the information from one surface of a disk, or the preamplifier chip 600 can be set up to receive two or more channels from two or more transducers 136. A multi-channel chip 600 which could receive and amplify the data from two data surfaces and two transducers 136 would be advantageous when the arm 136 is going to be inserted between two disks of a disk drive. In the event of the arm 134 being inserted between two disks, the two transducers 136 will read two separate surfaces. Therefore, each transducer 136 would have a set of wires 620 which attach to the preamplifier chip 600. The preamplifier 600 would determine which channel is being read and would send the appropriate signals down the wires 700 to the rest of the data channel after processing by the chip 600.

Also shown in FIG. 7 are the heat conducting fibers. The heat conducting fibers can be several individual fibers or can be a layer of fibers such as shown in FIG. 5. The heat conducting fibers transfer the heat from the preamplifier chip 600 to the surface of the arm 134 through the conductive bonding epoxy. The relative motion between the actuator arm 134 and the rotating disk 128 produces an air movement over the arm or over the surface of the arm 134. Passing the air over the surface of the arm 134 removes the heat from the surface of the arm and places it into the environment or disk enclosure of the disk drive. The heat conducting fibers are designed to remove the heat from the chip and place it over the various portions of the surface of the arm 134. It should be noted that a sufficient number of heat conducting fibers are needed to transfer heat from the chip to the large surface of the arm 134. The heat conductance of the fibers as well as the total heat produced by the chip 600 is known so an appropriate number of fibers can be used to carry the heat away from the chip. The heat conducting fibers and the electrical signal carrying wires 700 can be embedded in either a composite arm or in a ceramic arm. The arm can be made of a ceramic such as $AlB_4C$ cermet, available from Dow Chemical of Midland, Mich., and have the wire or flex cable attached to the surface of the arm. The amount of air passing over the arm 134 can also be determined based upon the air flow within the disk enclosure.

Figure 9:
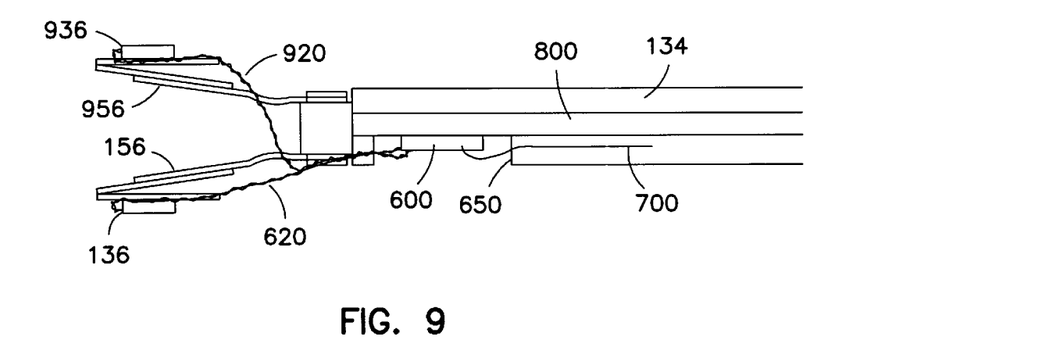
FIG. 9 is a side view of an arm having two heads and suspensions and a preamplifier chip.

FIG. 9 shows a side view of an arm 134 which includes a first transducer 136 and a second transducer 936. The second transducer 936 is carried by, or attached to, suspension 956. Suspension 956 is attached to the arm 134 at one end and carries the transducer 936 at the other. A set of signal-carrying wires 920 is attached to the head or transducer 936 at one end and attached to the chip 600 at the other end. The signal-carrying wires 920 pass through openings in the suspension 956 and suspension 156 and are then routed along the arm to the chip 600 within the arm 134. Several more wires 700 must be imbedded within the arm 134 and the actuator apparatus shown in FIG. 9. One of the additional wires 700 allows selection of signals from either the transducer 936 or the transducer 136 when they are reading or writing to or from a respective disk surface. The enable line will allow selection of signals to or from one of these transducers. The preamplifier chip 600 or die fits within the pocket 650 of the arm 134. It should be noted that the chip 600 is not within a traditional package but is the actual die. The chip 600 is then placed within the arm 134 which can be thought of as replacing the normal packaging.

Advantageously, the resulting actuator arm has the preamplifier mounted very closely to the transducer and the slider carrying the head. Basically, as the preamplifier is moved or placed in a closer proximity to the transducer, the interconnect impedance goes down and the frequency response of the data channel comprising the preamplifier chip, the lead wires 620 and the transducer 136 will go up. As higher and higher data rates are achieved and desired, it will be necessary to have all portions of the data channel operating at high frequencies. As a result, the signal produced has less noise and also features a higher frequency response. The material of the arm is capable of conducting heat away from the arm. In addition, a composite material conducts stray fields and prevents cross talk in the signal carrying leads. The material is strong enough to withstand the weight of the chip. The chip and the signal carrying wires can also be placed or embedded in the arm to prevent relative motion and an eventual open connection between the signal carrying wire and the preamplifier chip. The stiffness of the arm can also be controlled in various directions so that the resonances can be changed to frequencies other than the resonant frequencies of other components of the disk. An additional advantage is that the lighter actuator arm has increased shock resistance. The increased shock resistance yields a more robust drive.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An actuator arm for a disk drive comprising:
 a pivot end;
 a transducer end;
 a layer of material including a plurality of elongated fibers for conducting heat associated with said arm; and
 a chip attached to said arm near said transducer end, wherein the layer of material for conducting heat is embedded within said actuator arm, said layer sufficient to prevent the chip from overheating.

2. The actuator arm of claim 1 wherein the actuator arm is made of a composite material having one or more layers of elongated fibers.

3. The actuator arm of claim 2 wherein the elongated fibers are comprised of carbon.

4. The actuator arm of claim 1 wherein the actuator arm is made of a ceramic material.

* * * * *